Nov. 1, 1966  K. S. IRWIN  3,281,965
CONTROLLED VISIBILITY DEVICE FOR AN AIRCRAFT
Filed Aug. 2, 1965  2 Sheets-Sheet 1
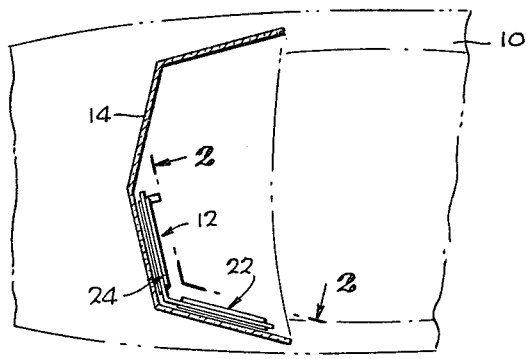
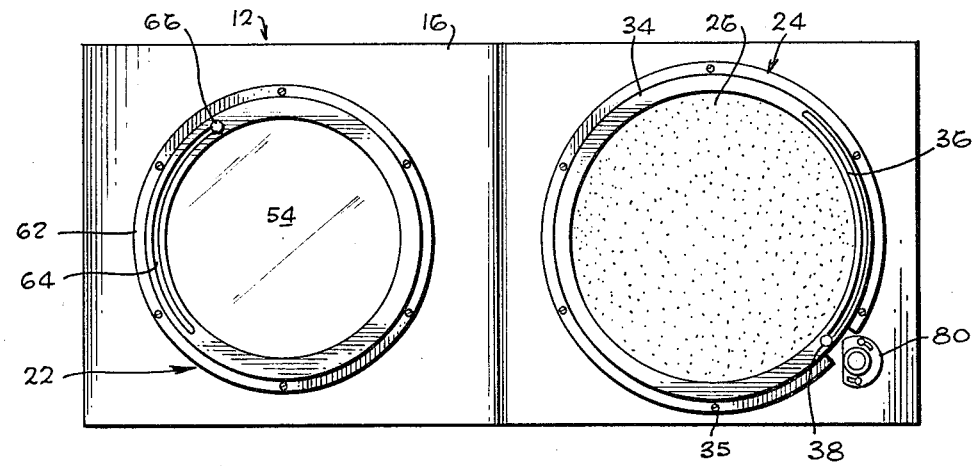
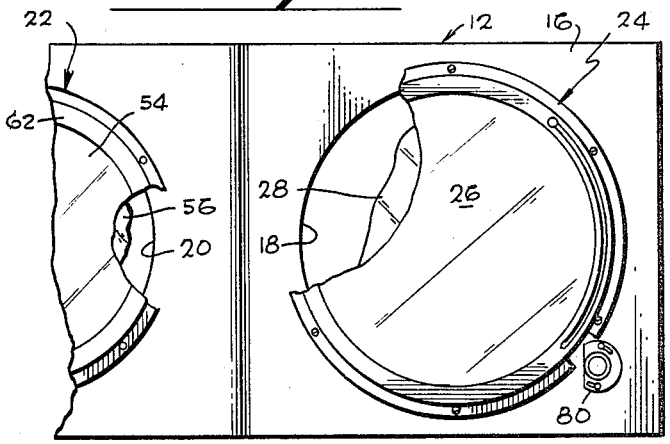
KIRK S. IRWIN
INVENTOR.
BY
Charles C. Wells
ATTORNEYS

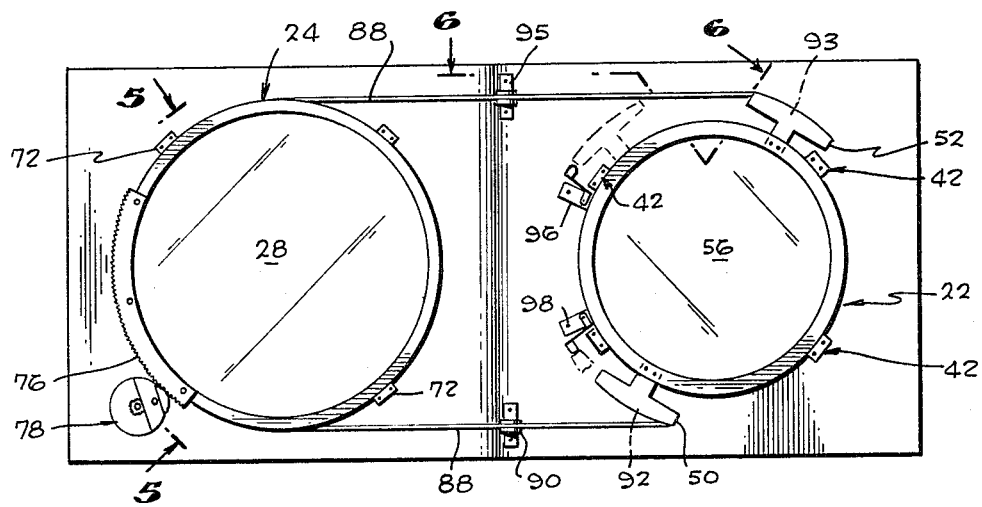
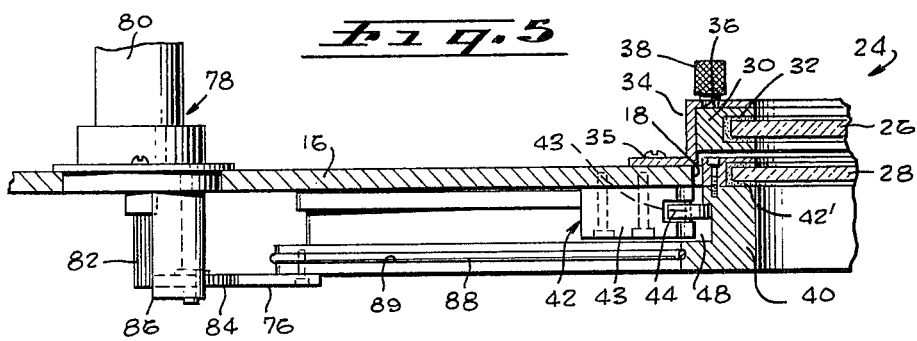
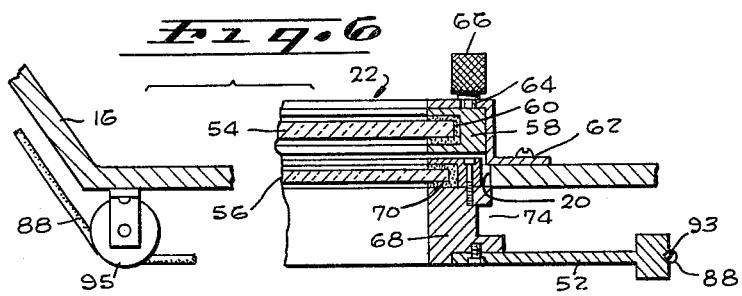

3,281,965
CONTROLLED VISIBILITY DEVICE FOR
AN AIRCRAFT
Kirk S. Irwin, Lancaster, Calif., assignor to the United
States of America as represented by the Administrator
of the National Aeronautics and Space Administration
Filed Aug. 2, 1965, Ser. No. 476,761
1 Claim. (Cl. 35—12)

The invention described herein may be manufactured and used by or for the Government of the United States of America for governmental purposes without the payment of any royalties thereon or therefor.

This invention relates in general to flight training devices for simulating flight conditions of poor or no visibility employed in training a pilot in instrument landing and flight procedures. More particularly, this invention is a controlled visibility window panel for an aircraft which makes it possible to vary the cockpit visibility from a condition of no visibility to a condition of good visibility in a gradual manner that closely approaches visibility conditions actually encountered by an aircraft breaking out from cloud cover in an instrument landing.

Blind flight simulator devices used heretofore have been many and varied. Examples of these are: cockpit hoods which block the view of the pilot, special blue goggles used in combination with orange plastic window panels which result in near zero visibility for the pilot when he looks out the window, and blinders which block out the outside view of the pilot when the pilot looks at his instruments.

These prior art devices have had the common disadvantage of allowing only instantaneous changes of visibility. In other words, they do not provide a realistic gradual breakout, but rather change instantaneously from the condition of no visibility to a condition of good visibility. In addition, with the use of these prior art devices, the removal of visibility restriction on the pilot is generally accomplished by the pilot himself, thereby reducing the effectiveness of the simulation. Further, the psychological effect of the pilot knowing that he can himself physically remove his visibility restriction at any time also affects adversely the effectiveness of training when utilizing such devices.

A controlled visibility panel or blind flight simulator device constructed in accordance with the principles of this invention avoids the disadvantages inherent in prior art devices. This is accomplished, briefly, by providing a controlled visibility panel member that is mounted over the cockpit windows such that it is positioned in the field of view of the pilot. The panel has a pair of openings formed therein, one directly in front of the pilot and one to the side of the pilot. These openings are each covered with a window or lens assembly that includes a pair of superimposed lenses constructed of a light polarizing material such as glass, plastic, or other suitable material. These superimposed lenses are rotated relative to one another to control the amount of light transmitted through the lens assembly. A control apparatus, including an electric motor, driving gears, and a cable and pulley assembly are connected to one of the lenses for rotation thereof so as to permit rapid and uniform selection of the visibility condition desired. The other lens in each lens assembly is manually adjustable. Inasmuch as the theory and principle of how two or more superimposed lenses or windows composed of light polarizing material can be oriented with respect to one another to control the light transmitted therethrough is well known, it will not be discussed in any detail herein. Suffice it to say that by proper angular orientation or alignment of the two polarizing lenses covering each opening in the panel, the pilot's visibility through the openings can be selected. The electric motor, which controls the position of one of the polarizing lenses in each lens assembly, is controlled by the flight instructor so as to enable him to select, at will, a desired visibility condition.

It is, therefore, a principal object of this invention to provide a greatly improved blind flight simulator device capable of realistically simulating poor visibility flight conditions.

It is another object of this invention to provide a blind flight simulator device wherein it is unnecessary to encumber the pilot with apparatus worn on his person.

A yet further object of this invention is to provide a blind flight simulator device which makes it possible to gradually change the pilot's visibility from a condition of no visibility to a breakout condition of good visibility.

Yet another object of this invention is to provide a blind flight simulator device wherein the pilot has no control over the visibility condition provided.

Other objects and advantages of this invention will become more apparent when considering the following detailed description in conjunction with the attached drawings wherein:

FIG. 1 is a broken away view of an aircraft and aircraft cabin in which a controlled visibility window panel has been installed in one side of the aircraft cabin.

FIG. 2 is a view of one side of the controlled visibility panel taken along lines 2—2 of FIG. 1.

FIG. 3 is a view similar to FIG. 2 with the polarizing lens assemblies partially broken away.

FIG. 4 is a view of the forwardly facing side of the controlled visibility panel.

FIG. 5 is a view, partially in section and broken away, taken along lines 5—5 of FIG. 4, that illustrates the details of the control apparatus for rotating the polarizing lens in each lens assembly and also illustrates the detalis of how the polarizing lenses are mounted in the panel member.

FIG. 6 is a view taken along lines 6—6 of FIG. 4 which illustrates details of the control mechanism and the mounting of the polarizing lenses in the panel member.

FIG. 7 is a broken away view of the driving connection between the electric motor mounted on the panel member and the control mechanisms attached to the polarizing lenses.

FIG. 1 of the drawing illustrates an aircraft with a controlled visibility device 12 mounted behind windows 14 of the cabin. The controlled visibility device consists of a panel member 16 in which two holes 18 and 20, see FIG. 2, have been provided. A pair of lens or window assemblies, 22 and 24, are mounted to the panel so as to cover openings 18 and 20. The panel member is positioned on one side of the aircarft cockpit directly behind the cockpit windows such that lens assembly 24 will be directly in front of the pilot's face, and the lens assembly 22 to one side of the pilot's head. By this arrangement the pilot's view is effectively restricted to what can be seen through the lens assemblies.

Lens assembly 24 consists of a pair of superimposed, transparent light polarizing lenses, 26 and 28, one of which, lens 26, is normally maintained in a fixed position while lens 28 is rotatably mounted with respect thereto. Lens 26 is mounted in annular frame member 30 with a gasket or seal 32 therebetween. Lens 26 and frame member 30 are retained in place by an annular mounting bracket 34 attached to panel 16, around the periphery of opening 18 by screws 35 or other suitable means. Mounting bracket 34 has an arcuate adjusting slot 36 formed therein, see FIG. 2, which receives a stem portion of an adjusting stud 38. The adjusting stud screws into annular frame member 30. It is apparent from a consideration of FIGS. 2 and 5 that by merely loosening the stud 38 it is possible to rotate lens 26, within limits determined by the length of slot 36, reltaive to mounting bracket 34. When the panel is installed in an aircraft and in use, lens 26 is maintained in a fixed position and frame member 30 is held snug against mounting bracket 34 by tightening the adjusting stud. Lens 28 is mounted in an annular frame member 40 with a gasket or seal 42' disposed therebetween. Frame member 40 is rotatably supported in opening 18 by means of four bearing assemblies 42 which consist of a block 43 and a roller bearing 44 mounted on a shaft 43' that is journalled in block 43. Roller bearing 44 rides in slot 48 formed in the periphery of annular frame member 40. This arrangement supports the frame member for rotation about its center and maintains the alignment of the frame member and lens 28 with respect to opening 18 in panel 16. Bearing assemblies 42 are suitably attached to panel 16 by bolts or other suitable means. A pair of T-shaped members, 50 and 52, see FIG. 4, are mounted on the periphery of annular frame member 40. The function and operation of these T-shaped members will be described in detail hereinafter.

Lens assembly 22, mounted in panel 16 is very similar to lens assembly 24 discusesd above and consists of a pair of superimposed lenses 54 and 56 which are mounted on panel 16 so as to cover opening 20 therein. Lens 54 is mounted in an annular frame member 58 with a seal or gasket 60 provided therebetween. The frame member is held in position by a mounting bracket 62 which has an arcuate slot 64 formed therein. An adjusting stud 66 passes through the arcuate slot and screws into annular frame member 58 so as to permit adjustment of the angular position of lens 54 and also to secure the annular frame member and lens in a fixed position. Lens 56 is mounted in a rotatably mounted frame member 68 with a gasket or seal 70 provided therebetween. Frame member 68 is rotatably supported in opening 20 by four bearing assemblies 72 which are identical in structure and operation to bearing assemblies 42 discussed above. The roller bearings (not shown) included in bearing assemblies 72 ride in groove 74 provided in frame member 68. Frame member 68 has an arcuate gear segment 76 attached thereto by bolts or other suitable means, and this gear segment engages a motor mechanism 78 shown in FIG. 7.

Motor assembly 78 consists of a reversible electric motor 80 mounted in panel 16. Output shaft 82 of motor 80 extends through panel 16 and engages a gear 84 mounted for rotation on extension 86 of the electric motor housing. Gear 84 is in driving engagement with gear segment 76 and thus rotation of output shaft 82 is translated into rotation of lens 28 with respect to lens 26. A cable 88 rides in groove 89 formed in frame member 40 and passes over a pulley assembly 90 mounted on panel 16 and is connected to T-shaped member 50. The other end of cable 88 passes over a pulley assembly 95 mounted on panel 16 and connects to T-shaped member 52. The T-shaped members are provided with grooves 92 and 93 which receive cable 88. Thus, rotation of gear segment 76 rotates lens 28 and frame member 40 and this rotation is translated to inner lens 56 and frame member 68 through the cable and pulley arrangement. Cable 88 can either be in one piece and pinned to frame member 40 to prevent slippage, or in two pieces with each piece attached to the frame member.

A pair of limit switches 96 and 98 are mounted on panel 16 in an appropriate position about the periphery of opening 20. Limit switches 96 and 98 are connected into motor assembly 78 by appropriate circuitry (not shown) so that when either of the limit switches are actuated by T-shaped members 52 and 50, as will be more fully described in the discussion of operation hereinafter, the operation of electric motor 80 will be interrupted.

This appropriate circuitry (not shown herein since it is state-of-the-art circuitry) includes suitable on-off switches which are controlled by the co-pilot or instructor in the cockpit of the aircraft during any flight instruction.

In operation, assuming the visibility panel is mounted in an aircraft in flight, the various components of the visibility panel are in a position illustrated in FIG. 4 wherein the pilot has good visibility through both lens assemblies. When it is desired to simulate blind flying conditions, the flight instructor will flip a switch to actuate motor 80 and thus rotate gear segment 76 and annular frame member 40 in a counterclockwise direction. This will rotate lens 28 to a position where no light is transmitted through lens assembly 24. Rotational motion of lens assembly 24 is translated through cable 88 to lens assembly 22. When lens assembly 22 has been rotated to a position wherein T-shaped member 52, as shown in dotted lines in FIG. 4, engages limit switch 96, the operation of the reversible electric motor 80 will be interrupted. At this point the pilot being trained is unable to see through lens assemblies 22 and 24 and the training in instrument landings and/or instrument flight can begin. Assuming that an instrument landing is to be practiced wherein the normal conditions encountered are a condition of no visibility at a certain altitude, with a gradual breakout to a condition of good visibility at a relatively low altitude, the pilot would begin his landing approach relying on instruments alone. At a certain preselected altitude or time the flight instructor would flip a switch actuating electric motor 80 so as to cause gear segment 76 and annular frame member 40 to be rotated in a clockwise direction. This should result in rotation of lens 28 and also lens 56 in lens assembly 22 to a position wherein the pilot has good visibility through the two lens assemblies. When a condition of maximum visibility has been obtained the T-shaped member 50 will engage limit switch 98 to interrupt the operation of reversible electric motor 80.

The length of time required for the lens assemblies to be rotated from a condition of no visibility to good visibility is, as is believed readily apparent, controlled by the speed of electric motor 80. Inasmuch as the change in visibility conditions normally encountered is somewhat gradual, it is usually desirable in order to achieve realism to rotate the lenses relatively slowly so as to gradually change from a condition of no visibility to a condition of good visibility. In the event that it should become desirable or necessary to suddenly change to a condition of good visibility, the flight instructor can grasp the adjusting studs 38 and 66 and manually turn the outer lenses 26 and 54 to a position where the pilot can see through the lens assemblies.

This completes the detailed description of this invention, and while a preferred exemplary embodiment has been described herein, it will be obvious to one skilled in the art to which this invention pertains, that many changes and modifications thereto can be made without departing from the spirit and scope of the invention as defined in the claims appended hereto.

What I claim is:

A controlled visibility device for mounting in an aircraft cabin so as to control the visibility of a pilot operating the aircraft and thereby realistically simulate blind flying conditions, said visibility device comprising:
 (a) a panel removably mounted over the cabin window of the aircraft;
 (b) said panel having a first circular opening directly in front of the pilot, and a second circular opening at one side of the pilot;
 (c) a first pair of superimposed discs of light polarizing material covering the first opening in said panel and a second pair of superimposed discs of light polarizing material covering the second opening in said panel;

(d) one of the discs in each pair of discs being mounted on said panel in a normally fixed position whereas the other disc in each pair is rotatably mounted on said panel;

(e) servo means mounted on the panel and connected to the rotatably mounted discs for rotating them in unison to continuously and selectively vary the visibility through said first and second pairs of superimposed discs from none to good visibility; said servo means including:

(1) a first annular frame member in which the rotatably mounted disc of superimposed discs is mounted, said frame member being supported for rotation by a plurality of roller bearing assemblies mounted to said panel around the periphery of the first opening in said panel;

(2) a second annular frame member in which the rotatably mounted disc of said second pair of superimposed discs is mounted, said frame member being supported for rotation by a plurality of roller bearing assemblies mounted to said panel around the periphery of the second opening in said panel;

(3) an electric motor mounted on said panel, (4) mechanical means connected between said electric motor and said first tand second frame members for rotation thereof by said electric motor; said mechanical means including:

(i) a pair of T-shaped members mounted in a spaced relation on said first annular frame member;

(ii) a gear segment mounted on said second annular frame member, said gear segment being in driving connection with said electric motor;

(iii) a first cable connected between one of said pair of T-shaped members and one end of said gear segment, and (iv) a second cable connected between the other one of said pair of T-shaped members and the other end of said gear segment, whereby rotation of said second annular frame member by said electric motor and said gear segment, in either a clockwise or counterclockwise direction, will be translated to said first annular frame member through said first and second cables and said pair of T-shaped members.

References Cited by the Examiner

UNITED STATES PATENTS

| | | | |
|---|---|---|---|
| 1,833,970 | 12/1931 | Levick | 35—12 |
| 2,090,132 | 8/1937 | Lacoe | 35—12 |
| 2,368,117 | 1/1945 | Damian | 88—41 |
| 2,403,195 | 7/1946 | Ross | 35—12 X |
| 2,417,317 | 3/1947 | McMains | 35—12 X |
| 2,440,274 | 4/1948 | Ibisch | 35—12 X |
| 2,492,969 | 1/1950 | Crane | 35—12 |
| 2,510,848 | 6/1950 | Wood | 35—12 |
| 2,842,868 | 7/1958 | Belter | 35—12 |
| 3,001,300 | 9/1961 | Green | 35—12 |
| 3,015,988 | 1/1962 | Hemstriet | 35—12 X |

EUGENE R. CAPOZIO, *Primary Examiner.*

S. M. BENDER, *Assistant Examiner.*